United States Patent [19]

Beamon, III

[11] Patent Number: 5,040,058

[45] Date of Patent: Aug. 13, 1991

[54] RASTER GRAPHIC HELMET MOUNTABLE DISPLAY

[75] Inventors: William S. Beamon, III; Richard Economy, both of Ormond Beach, Fla.

[73] Assignee: General Electric Company, Syracuse, N.Y.

[21] Appl. No.: 456,490

[22] Filed: Dec. 26, 1989

[51] Int. Cl.⁵ ............................................. H04N 7/00
[52] U.S. Cl. ..................................... 358/103; 358/93; 358/206; 358/60; 340/705; 359/197
[58] Field of Search ............... 358/103, 104, 109, 200, 358/87, 88, 89, 90, 91, 2, 93, 206, 208, 60; 340/705, 706, 704; 350/6.5, 6.6

[56] References Cited

U.S. PATENT DOCUMENTS

| | | | |
|---|---|---|---|
| 3,614,314 | 10/1971 | Henry | 358/91 |
| 3,670,097 | 6/1972 | Jones | 358/91 |
| 4,028,725 | 6/1977 | Lewis | 358/103 |
| 4,722,601 | 2/1988 | McFarlane | 340/705 |
| 4,761,056 | 8/1988 | Evans et al. | 358/93 |
| 4,897,715 | 1/1990 | Beamon, III | 358/104 |

FOREIGN PATENT DOCUMENTS 2206421  1/1987  United Kingdom ............... 340/705

Primary Examiner—Howard W. Britton
Assistant Examiner—Michael H. Lee
Attorney, Agent, or Firm—Paul Checkovich; Richard V. Lang

[57] ABSTRACT

A helmet mountable display includes electronic apparatus for ultimately providing sweep lines of a full color raster graphic image and electromechanical apparatus for disposing the sweep lines to appear at their proper spatial position at the image. The electronic apparatus may include a cathode ray tube having a strip of red, green and blue emitting phosphor, and either one electron gun for sequentially scanning a trace in each strip or three electron guns for parallel scanning in response to respective color video information. The three traces are superimposed and registered, such as by color information delay apparatus, a focusing optical system or a combination thereof, to form a sweep line so that the sweep line exhibits full color characteristics which form a portion of the image. The shape of the electron beam that forms the traces in the strips may be elongated transverse the direction of the sweep and later compressed, such as by a cylindrical lens, for allowing a higher intensity or increased brightness trace to form the image without exceeding the peak energy handling capability of the phosphors.

13 Claims, 4 Drawing Sheets

RASTER GRAPHIC HELMET MOUNTABLE DISPLAY

BACKGROUND OF THE INVENTION

This invention was made with Government support under NAS1-18711 awarded by the National Aeronautics and Space Administration. The Government has certain rights in this invention.

This invention relates to helmet mountable displays, and, more particularly, to a raster graphic helmet mounted display for full color images wherein the raster for the image is generated by a combination of electronic and electro-mechanical elements. The display may be used in simulation systems like trainers, or during actual vehicle or aircraft operation as a display for sensors and/or instruments.

One type of helmet mountable, full color display system using electromechanical elements for scanning in orthogonal directions is described and claimed in U.S. Patent Application Ser. No. 264,621, filed Oct. 31, 1988 (now allowed) - Beamon, assigned to the present assignee hereof and incorporated in its entirety herein by reference thereto. Although the Application 264,621 offers a substantial improvement over prior display systems, alignment of the optical system, including fiber optic light sources, four lenses, folding mirror, horizontal and vertical scanning mirrors and rear projection screens may require significant manual intervention with attendant costs.

It is known to use monochrome CRT's that are mounted on a helmet for producing monochrome, but not full-color, images. For use as a helmet mounted color rendering cathode ray tube (CRT), it is desirable that the CRT face plate display a full color image having a diameter of about 0.875 inches ±25 percent which size is believed to be currently available for a monochrome (but not full color) CRT display. Further, it is desirable that the full color image be represented by about 1000 lines per frame at a frame rate such as the NTSC frame rate of 30 Hz, either interlaced or non-interlaced, with each line having about 1000 picture elements (pixels). Size and weight considerations militate against mounting on a helmet the smallest color rendering CRT's commercially available, which present full color images on the order of 7-9 inches in diameter.

In U.S. Pat. No. 4,028,725-Lewis it is stated that pictures may be produced in field sequential color for a helmet display. Field sequential color refers to a system which uses a CRT having a substantially white light emitting phosphor wherein three color filters (typically red, green and blue), such as may be spaced over 120° of a wheel which is synchronously spun with respect to the images generated on the CRT, are disposed between the face of the CRT and an observer and are used for generating three fields which are combined by the observer due to persistence of the eye into a full color display. In a typical system, each field may be updated at a 20 Hz rate. Because of the relatively low update rates used, field sequential color systems are susceptible to color separation or artifacts, especially at the edges of a relatively rapidly moving object, that appear as a red, green or blue outline depending on where the object was during the prior two different color fields.

It would be desirable to provide a raster graphic helmet mounted display for presenting full color images that combines the advantages of electrical and electro-mechanical scanning techniques while overcoming limitations, such as noted above.

Accordingly, it is an object of the present invention to provide a raster graphic helmet mounted observer wherein the first raster scanned full color image is available at the predetermined position.

The step of superimposing may include delaying the first video information for all the traces but one of the corresponding raster sweep line with respect to the but one trace. The step of superimposing may also either alternatively or in combination with the delaying step include passing the traces for the corresponding raster sweep lines through optical means for coinciding the traces of the corresponding raster sweep line at the predetermined position along the optical path.

In another aspect of the present invention the traces may be generated on a screen of a cathode ray tube with three traces corresponding to red, green and blue color components being used. The trace for each of the red, green and blue color components may be generated by an electron beam having an image that is elongated transverse the direction of the corresponding trace for each of the red, green and blue color components and then compressing the image of the electron beam in a direction transverse the direction of the corresponding trace for forming a substantially circular image of the electron beam at the predetermined position. The step of generating display that uses electronic and electro-mechanical scanning techniques for generating a raster scanned full color image.

Another object of the present invention is to create a real or virtual image that is equivalent to a full color raster scanned image that may be typically displayed on the face plate of a standard CRT which uses electronic and magnetic deflection for forming a raster, wherein the real or virtual image may be used in a helmet mounted raster scanned full color image display system.

SUMMARY OF THE INVENTION

In accordance with the present invention, for a helmet mountable display system, a method for forming a first raster scanned full color image in response to first video information for presentation to an observer comprises generating a respective substantially parallel trace for each of a first plurality of color components of a corresponding raster sweep line of the image in response to corresponding color portions of the first video information, reflecting the traces in a direction transverse to the traces and superimposing the traces for each raster sweep line at a predetermined position along an optical path from the traces to the traces may include sequentially generating traces by a single electron beam or in the alternative generating traces by a corresponding electron beam for each trace.

In yet another aspect of the present invention, a helmet mountable display system for supplying a first raster scanned full color image for presentation to a wearer of the helmet in response to first video information comprises electronic means for generating a sweep line for each of a plurality of colors, the intensity of each sweep line in response to corresponding color information of the first video information and reflecting means having a reflecting surface with the reflecting surface optically coupled to the electronic means and displaceable about an axis. The reflecting means is for scanning the sweep line transverse to the sweep line when the reflecting surface is displaced about the axis for providing the first raster scanned full color image at a predetermined position along an optical path from the sweep line to the wearer.

The system may further include delay means for delaying video information for all sweeps but one with respect to the best one sweep for ensuring proper sweep registration when the sweeps are superimposed. The system may also include optical means, such as a convex-convex lens disposed between the cylindrical lens and the observer for focusing the sweeps so that they are superimposed at a predetermined position along the optical path for the optical means to the observer.

For still another aspect of the present invention, the sweep line for each of the plurality of colors may be formed by an electron beam wherein the electron beam has an image that is elongated traverse the direction of the corresponding sweep line. In such case, the system includes optical means, such as a cylindrical lens, for compressing the image of the electron beam in a direction transverse the direction of the corresponding sweep line for forming a substantially circular image of the electron beam at the predetermined position along the optical path.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION OF THE INVENTION

Figure 1:
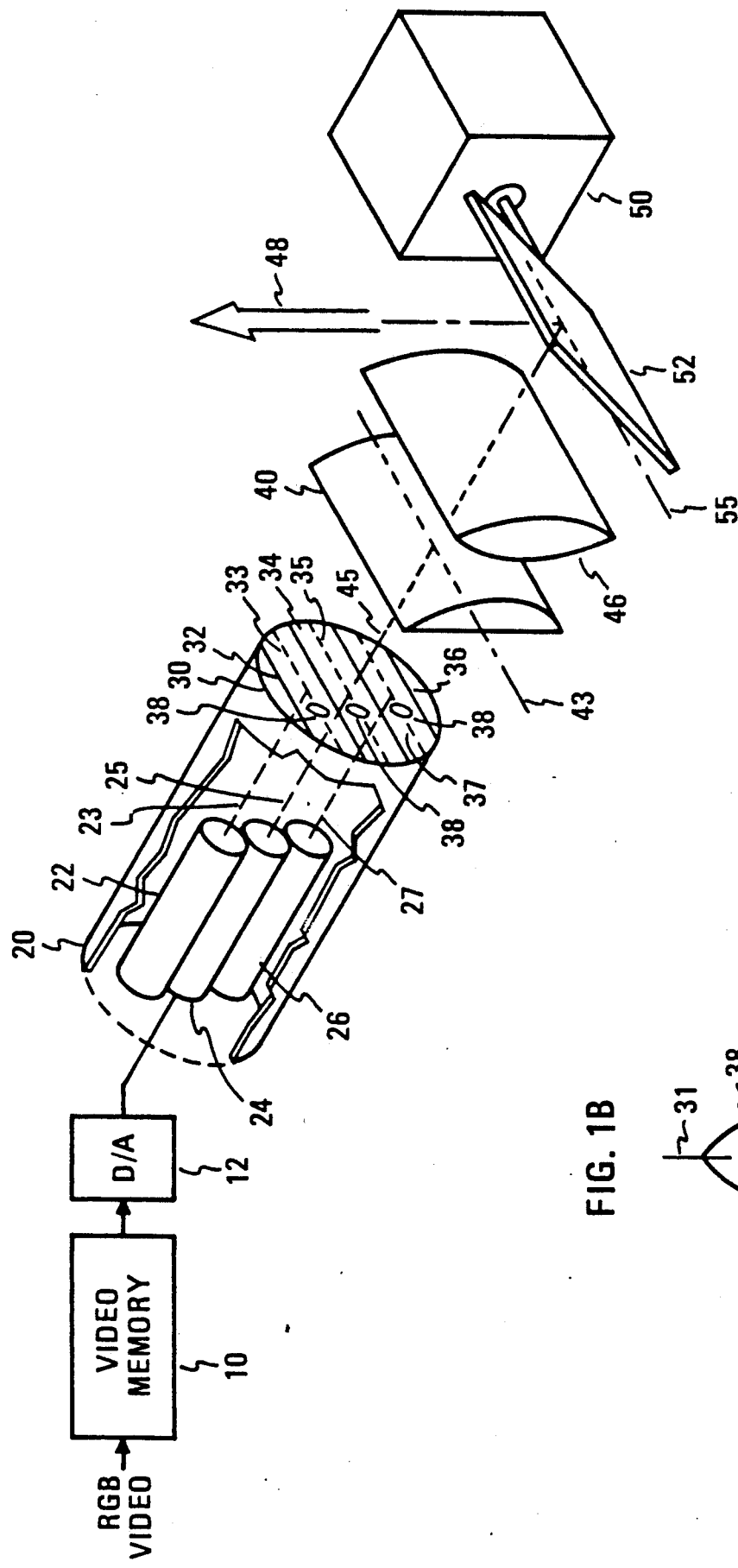
FIG. 1A is a partial electronic block and partial schematic perspective diagram of one embodiment of the present invention.
FIG. 1B is an elevation plan view of an electron beam image as it appears on the face of a CRT and is useful with the present invention.

Referring to FIG. 1A, a partial electronic block and partial schematic perspective diagram of one embodiment of the present invention is shown. The apparatus shown includes cathode ray tube (CRT) 20 having a face plate 30, scanning means 50 having a planar scanning mirror 52 optically coupled to face plate 30 of CRT 20, strip lens 40 disposed in the optical flow path between face plate 30 and scanning means 50 and electronic control circuitry 10 having an output connected to an input of CRT 20.

CRT 20 further includes three electron emitting guns 22, 24 and 26 and bands 32, 34 and 36 of luminescent material, such as phosphors, that emits light when stimulated by energy, such as by electrons emitted from guns 22, 24 and 26, respectively. Guns 22, 24 and 26 are shown to be in-line. That is, the electron emitting portions thereof lie substantially along a single line. Alternatively, guns 22, 24 and 26 may be disposed in triad wherein the electron emitting portions thereof lie at a respective vertex of a triangle.

Phosphors 32, 34 and 36 are disposed in bands or stripes on the backside or inside of face plate 30. Phosphors 32, 34 and 36 are selected so that each phosphor emits a different color when energized. For an embodiment of the present invention, phosphor 32 is selected to emit red, phosphor 34 to emit green and phosphor 36 to emit blue. The order of the color sequence is not critical to the present invention.

Gun 22 emits electrons in a beam that is directed by deflection circuitry (not shown) along beam path 23 to energize red phosphor 32. Likewise guns 24 and 26 emit electrons in beams that are directed by respective deflection circuitry (not shown) along respective beam paths 25 and 27 to energize phosphors 34 and 36, respectively. The accelerating voltage of the electrons emitted from each gun 22, 24 and 26 and shape of the outer margin of the electrons in beam paths 23, 25 and 27 determine the intensity of the light emitted from the material of band 32, 34 and 36, respectively. The modulation of the electron beams necessary to depict pixel colors at video rates is performed by control guides in the electron guns in a conventional manner.

Strip lens 40 may be plano-convex as shown in FIG. 1A with the planar side facing face plate 30 and the convex side, the contour of which may be a portion of a cylinder, facing scanning mirror 52. Alternatively, an individual strip lens 40 may be used for each color light path between face plate 30 and mirror 52. Lens 40 is an anamorphic lens in that it focuses or converges light rays passing through it along one axis and not along another. That is, light rays that are parallel to and in the direction of optical axis 45 toward lens 40 and that are intercepted by lens 40 will be converged toward a plane including longitudinal axis 43 and optical axis 45 by lens 40, while in the horizontal direction (from end face to end face) no change in direction is experienced by light passing therethrough. As shown in FIG. 1A, this means that light will be focused by lens 40 in a vertical direction but not in a horizontal direction.

In operation, electrons from gun 22 are directed, or deflected, to scan a line or trace 33 across band 32, electrons from gun 24 are directed to scan a line or trace 35 across band 34 and electrons from gun 26 are directed to scan a line or trace 37 across band 36. The respective scanning beam 23, 25 and 27 contains color modulation information for the red, green and blue color components supplied by electronic control 10. Lines 33, 35 and 37 are all scanned in the same direction and when able to be exactly superimposed as explained hereafter, are registered such that the intensity of the red, green and blue light emitted from the phosphors of bands 32, 34 and 36, respectively, in response to color modulation information from electronic control 10 determines the intensity of a full-color picture element (pixel) of a line of the raster scanned image. Red, green, blue (RGB) video may be supplied by a computer image generator such as is disclosed and claimed in U.S. Pat. No. 4,727,365 - Bunker et al which is assigned to the instant assignee hereof.

Referring to FIG. 1B, an elevation plan view of an electron beam image as it appears on the face of a CRT and useful with the present invention is shown.

Electron beam image 38 (not necessarily to scale) is elongated in one direction, such as to form an ellipse or oval. Axis 39 of beam image 38, which lies perpendicular to longitudinal axis 31 of beam image 38 at the midpoint of longitudinal axis 31, coincides with traces 33, 35 and 37 of bands 32, 34 and 36, respectively, (FIG. 1A) such that the elongated portion of beam image 38 is transverse traces 33, 35 and 37. Beam images 38 are further disposed such that longitudinal axis 31 is oriented to supply light from traces 33, 35 and 37 to lens 40 (FIG. 1A) so that optical compression occurs by operation of lens 40 in a direction parallel to axis 31 so that at the output of lens 40, beam images 38 appear to be substantially circular. Thus traces 33, 35 and 37 have a width corresponding to the length of longitudinal axis 31. Beam images 38 and relative instantaneous positioning for traces 33, 35 and 37 for one pixel of an image ultimately to be displayed when traces 33, 35 and 37 are able to be exactly superimposed are shown in FIG. 1A.

Although a conventional round beam image may be used, in which case lens 40 is not required, there are advantages obtained when using an elliptical beam image as shown by way of example in FIG. 1B. Use of an elongated beam image 38 reduces electron density from guns 22, 24 and 26 (FIG. 1) for a predetermined brightness from the luminescent material of bands 32, 34 and 36 by spreading the required electrons from guns 22, 24 and 26 over a larger area than for a circular beam image. This avoids catastrophic failure or burning of the luminescent material of bands 32, 34 and 36 by lowering the peak electron or energy density at all points within beam image 38. Stated another way, more energy or greater electron beam intensity can be provided to the luminescent material of bands 32, 34 and 36 for forming elongated beam image 38 without exceeding the energy or intensity level at which the luminescent material will suffer catastrophic failure or burning. Alternatively, a predetermined electron density may be distributed over the area of beam image 38, such that when beam image 38 is compressed in the vertical direction by lens 40, a brighter spot is available at mirror 52 then if beam image 38 had been initially round, without endangering or damaging the phosphors of bands 32, 34 and 36.

Figure 6:
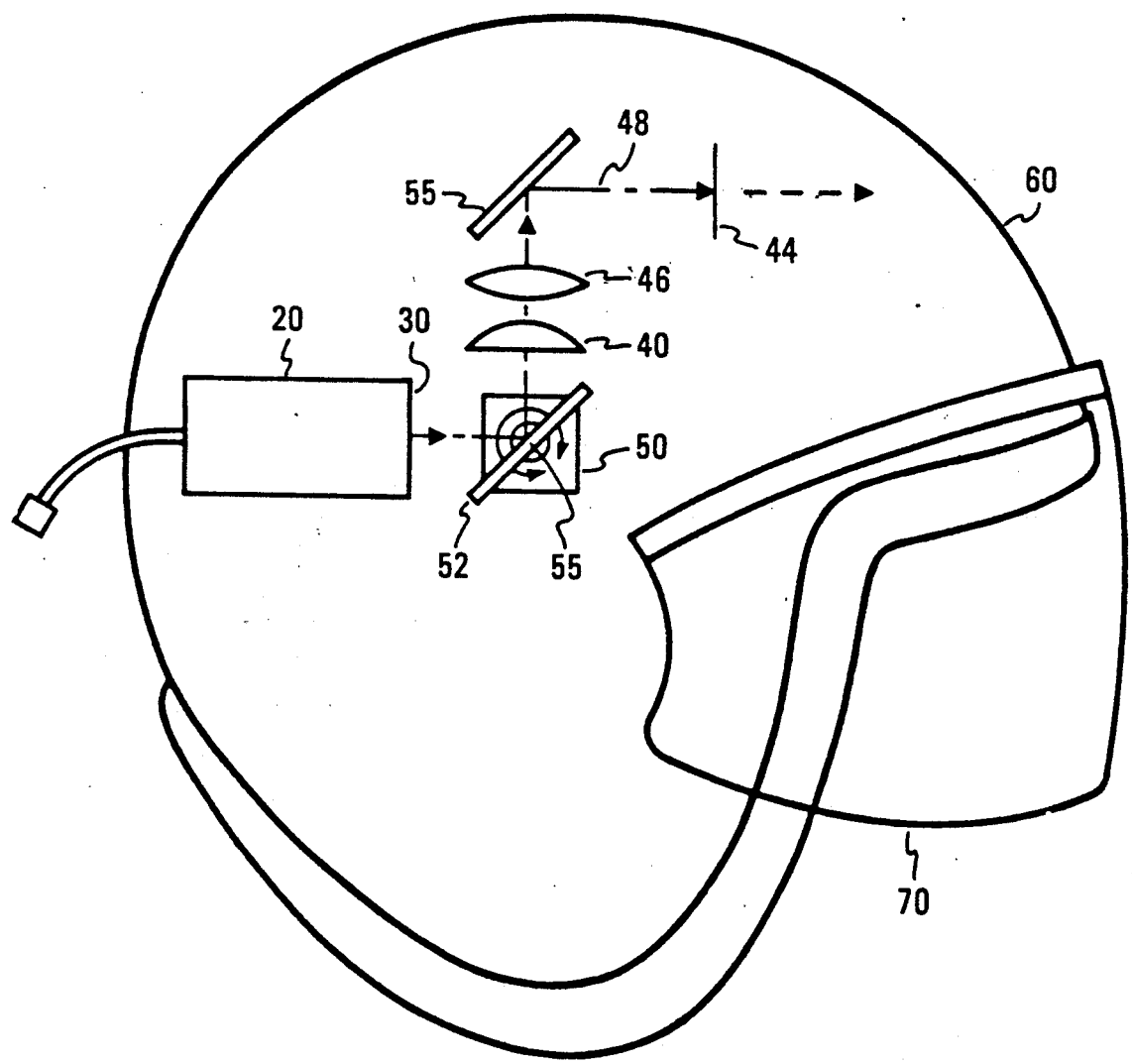
FIG. 6 is a side elevation plan view of another embodiment of the present invention.

Also shown included in the optical path between lens 40 and mirror 52 is a strip convex-convex lens 46 for focusing traces 33, 35 and 37 to superimpose traces 33, 35 and 37 so that they coincide at a predetermined position or image plane along optical path 48 from the output of lens 46 to an observer. The image plane along optical path 48 is selected so that it is convenient to couple an optical system, which may include lenses, prisms, mirrors, to the image plane for transporting the raster scanned image to the observer as is known in the art. Lens 46 may also be disposed along optical path 48 between mirror 52 and the observer as shown in FIG. 6.

Lens 40 is configured such that light from elongated beam 38 of bands 32, 34 and 36 is compressed along axis 31 to form a circular image thereof at the output of lens 40. If light from bands 32, 34 and 36 is able to be superimposed on each other at the predetermined position along path 48 such that corresponding information for a pixel from bands 32, 34 and 36 exactly overlap or coincide, then neither lens 46 nor any delay of second (green) sweep 35 with respect to first sweep (red) 33 nor any delay of third (blue) sweep 37 with respect to second (green) sweep 35 is required. Thus, light reflected from mirror 52 will exhibit full-color characteristics of each pixel of a line of a raster scanned image at the predetermined position along path 48. If light from bands 32, 34 and 36 is not able to be superimposed on each other at the predetermined position along path 48 then either lens 46 or delay among sweeps 33, 35 and 37 as explained with reference to FIGS. 3 and 4 or a combination thereof may be used to ensure that such superimposition occurs.

In this manner a line of a raster scanned image is formed. For completing the raster scan, lines of the raster, either per field or per frame, must be able to be sequentially presented and have the appropriate spatial orientation with respect to other lines of the raster scan.

Scanning means 50 may include an electrical motor galvanometer for rotating or oscillating mirror 52 about axis 55. Control of the motor of scanning means 50 and motion of mirror 52 is synchronized to the tracing of lines 33, 35 and 37 as is known in the art. For example, for a display frame raster having 1000 lines mirror 52 is sequentially indexed through 1000 positions if a full frame at a time is to be scanned and through 500 positions returning to a position to place the first line of the second field between the first and second lines of the first field if two interleaved fields of the frame are to be scanned. At each indexed position of mirror 52 a full line of image data is available from traces 33, 35 and 37.

For the following discussion, operation for scanning two interlaced fields of a frame will be explained, it being understood that a frame can be scanned by a non-interlaced raster analogously to a field with appropriate modification for desired interline spacing and for the total number of lines to be scanned before restarting the raster.

For the first raster line of a field, line traces 33, 35 and 37 may be combined by lens 46 to constitute a single raster line at the surface of mirror 52. Mirror 52 deflects and directs the single raster line along a optical path 48 toward the desired image plane such that at the desired image plane the raster line appears in its desired image position.

For a rectangular raster, the first or initial line of the field is either at one of the far left or far right for vertical raster scanned images, or far top or far bottom for horizontal raster scanned images with additional lines being sequentially supplied in an opposite direction. That is, if the initial line of a raster sweep is horizontal at the far top, then succeeding lines of the raster will be sequentially disposed from top to bottom, and if the initial line of a raster sweep is vertical at the far left, then succeeding lines of the raster will be sequentially disposed from left to right. Scanning for initial lines disposed at the far right and far bottom may be analogously configured but in the opposite direction from that of initial lines disposed at the far left and far top, respectively.

In order to effectuate proper interline spacing between sequential lines of the field, mirror 52 is rotated or indexed a predetermined amount in a predetermined direction around axis 55. Axis 55 is disposed parallel to mirror 52 and parallel to longitudinal axis 43 of lens 43 and to traces 33, 35 and 37 such that when mirror 52 is rotated, each next sequential raster line at the desired image plane is parallel to all other previous sequential raster lines.

The sequence of steps for forming a line of a raster scanned image may be as follows: index mirror 52 to a predetermined position; generate traces 33, 35 and 37 of respective colors; combine the traces to superimpose over each other at the image plane and reflect traces 33, 35 and 37 to the image plane for forming the line of the raster scanned image in its appropriate spatial position. This sequence of steps may be repeated until the last line is delivered to the image plane after which mirror 52 is re-indexed, or reset, to deliver an initial line of the second field to be disposed between the initial line and the next sequential line of the first field. For supplying lines of the raster at the image plane for a frame, generally mirror 52 will sequentially supply the lines from the initial one to the last one of the raster.

Figure 2:
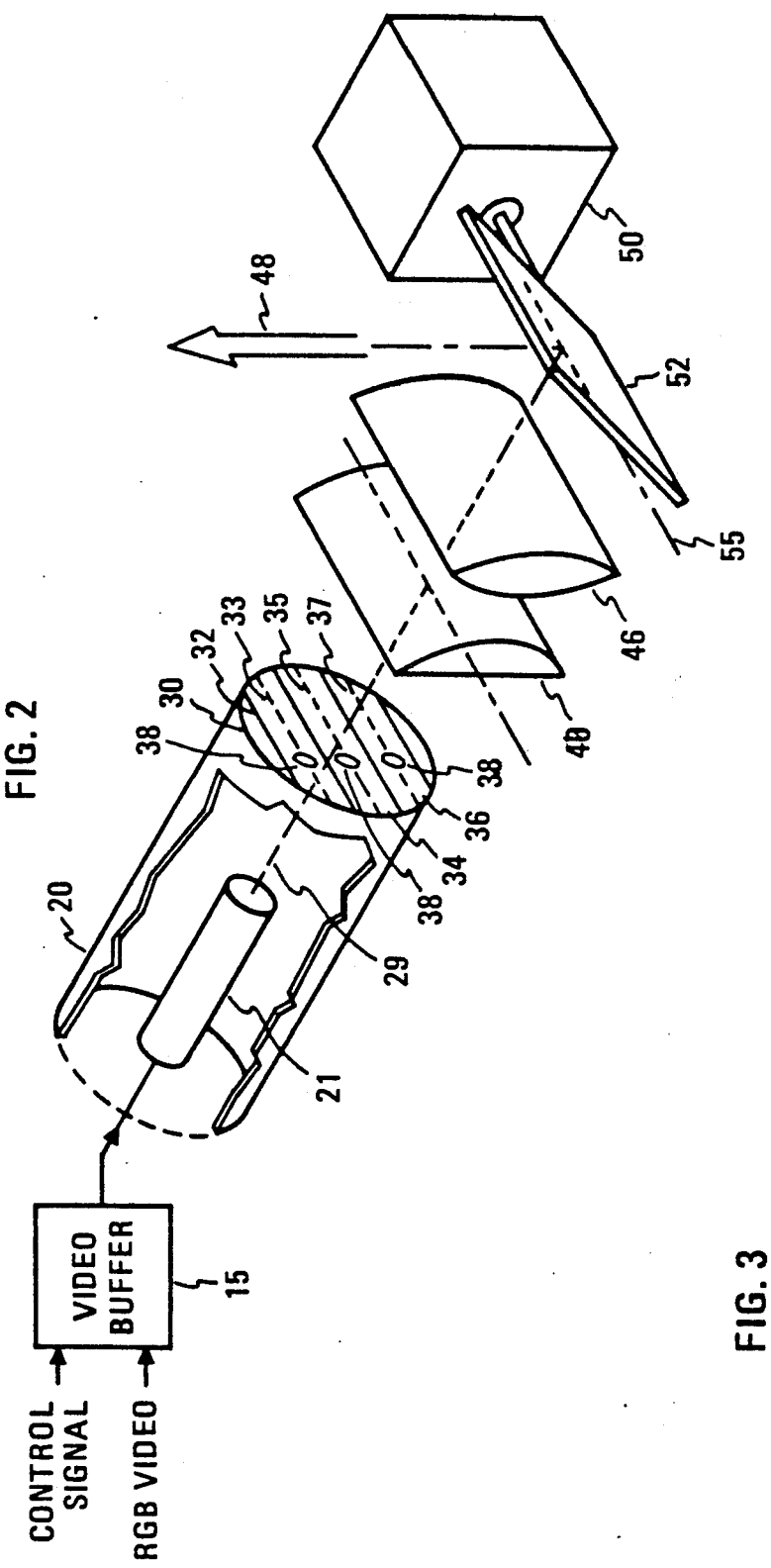
FIG. 2 is a partial electronic block and partial schematic perspective diagram of another embodiment of the present invention.

Referring to FIG. 2 another embodiment of the present invention is shown.

CRT 20 includes a single electron emitting gun 21 which emits an electron beam 29. CRT 20 also includes electronic control circuitry (not shown) for controlling emission of electrons from gun 21 in response to video information provided thereto from video buffer 15, and for controlling deflection of electron beam 29 as is known in the art. Video buffer 15 includes an output connected to an input of CRT 20 for supplying the video information signal thereto. Video buffer 15 also includes inputs for receiving a control signal and an RGB video signal, respectively.

The RGB video signal may be provided as hereinbefore described. Video buffer 15 may include a storage or memory device, such as a high speed video memory, for individually storing each color component of the video signal for later recall. The control signal regulates the distribution to CRT 20 of each of the R, G and B color components of the video that has been previously supplied to video buffer 15, typically in digital format. In effect, video buffer 15 acts as a delay device for two of the three color components of the video signal with respect to the third color component of the video signal.

Electron beam 29 sequentially scans each trace 33, 35 and 37. Inasmuch as a single gun 21 is serially scanning each trace 33, 35 and 37, video information for controlling electron beam 29 for trace 35 must be delayed with respect to video information for controlling electron beam 29 for trace 33 in order to ensure proper pixel information registration between trace 33 and 35 when traces 33 and 35 are superimposed along optical path 48. Likewise video information for controlling electron beam 29 for trace 37 must be delayed from video information controlling electron beam 29 for trace 35 in order to ensure proper pixel information registration among traces 33, 35 and 37 when they are superimposed along optical path 48.

It is to be expected that if video information for trace 35 is delayed a time interval T with respect to video information for trace 33, then video information for trace 37 will have to be delayed a time interval 2T, that is, twice as long as the delay for video information for trace 35 with respect to trace 33. The control signal supplied to video buffer 15 effects the appropriate delays and timing for providing video information from video buffer 15 to CRT 20.

Figure 3:
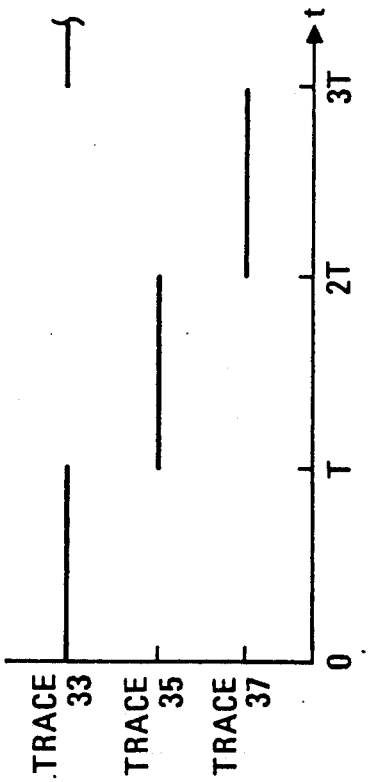
FIG. 3 is a timing diagram for circuitry of FIGS. 1A and 2.

Referring to FIG. 3, a graphical representation of the relationship among traces 33, 35 and 37 for the configuration illustrated in FIG. 2 is shown. It may also be necessary to delay video information for the configuration illustrated in FIG. 1A in which case an analogous relationship among traces 33, 35 and 37 to that shown in FIG. 3 may be expected. In addition, a combination of delayed video information and/or lens 46 may be used to ensure superimposition of traces 33, 35 and 37 with proper registration along optical path 48 as hereinbefore described.

Assume that video information for trace 33 of a raster line of the image to be displayed is provided to CRT 20 at time t equals zero, as time is indicated along the abscissa. Then at time t=T video information for trace 35 of the same raster line is provided to CRT 20 and at time t=2T video information of still the same raster line for trace 37 is provided to CRT 20. At time t=3T video information for trace 33 of a next raster line of the image to be displayed may be provided to CRT 20. Synchronizing traces 33, 35 and 37 in this manner ensures that three color information for each pixel of a raster line will be registered when traces 33, 35 and 37 are superimposed on each other along optical path 48.

Figure 4:
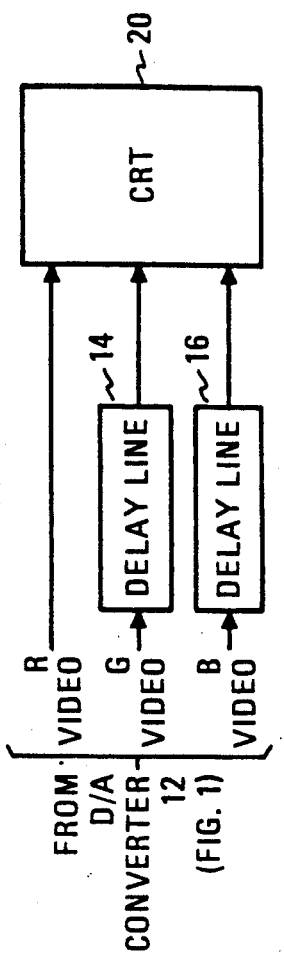
FIG. 4 is a schematic diagram of circuitry useful with the apparatus of FIGS. 1A and 2.

Referring to FIG. 4, apparatus useful with another embodiment of the present invention is shown. If the R, G and B video signals are in analog form, such as from the output of digital to analog converter 12 (FIG. 1A) having an input for receiving digital color information from video memory 10 (Fig 1A) and an output for supplying corresponding analog color information to CRT 20 (FIG. 1), then analog delay lines 14 and 16 for the G and B video components, respectively, which correspond to traces 35 and 37 may be interposed between the source of RGB video and CRT 20 for delaying the G and B components with respect to the R component analogously to the digital delay effected by video buffer 15 (FIG. 2) as illustrated in FIG. 3. It is to be understood that D/A converter 12 will include a respective input for each input color component and a corresponding respective output for each output color component.

Figure 5:
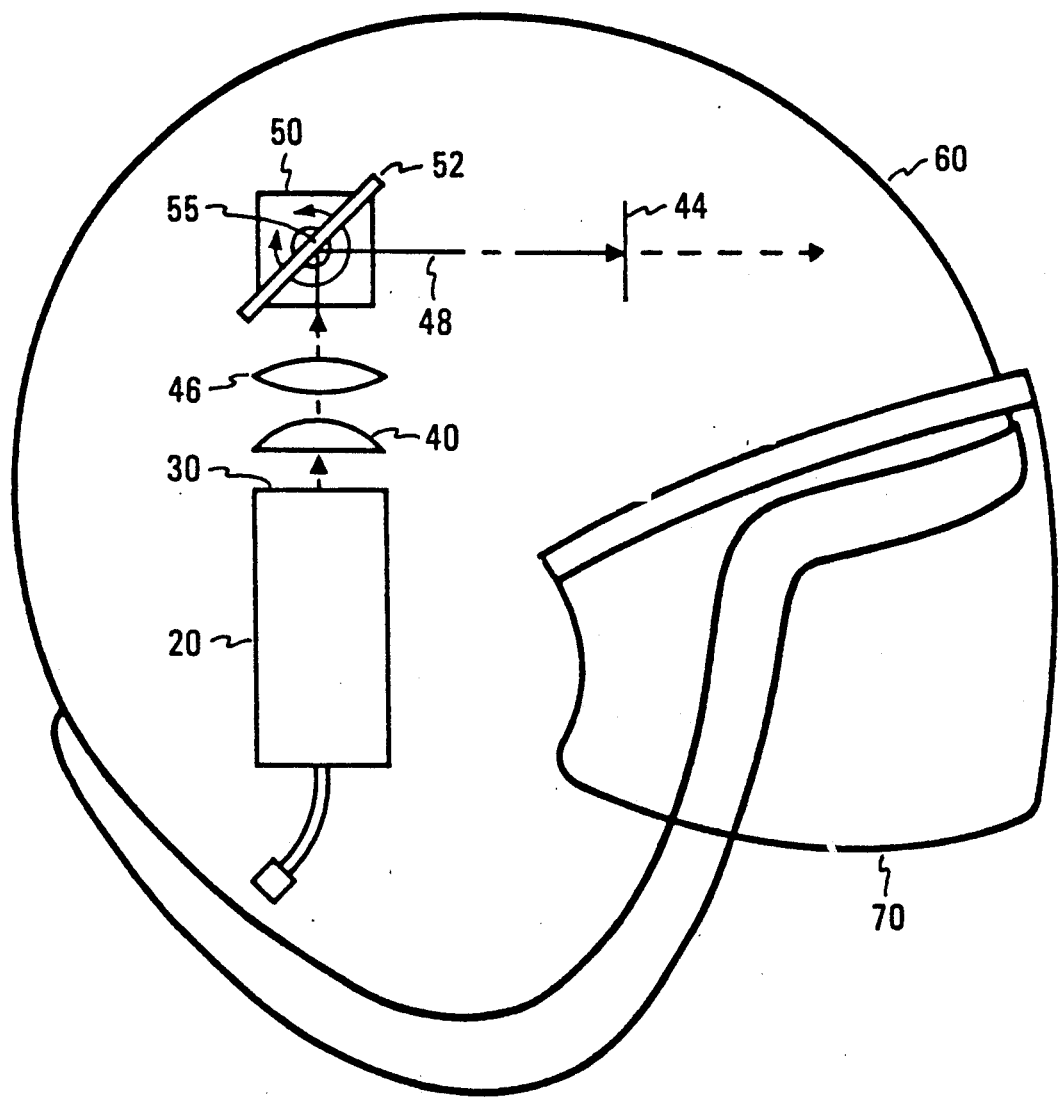
FIG. 5 is a side elevation plan view of an embodiment of the present invention.

Referring to FIG. 5, an elevation plan view of an embodiment of the present invention not necessarily to scale is shown. CRT 20 is mounted or fixedly attached to helmet 60 such that face plate 30 thereof points substantially upward or in a vertical direction when helmet 60 is being worn by an observer. Scanning means 50 is mounted or fixedly attached to helmet 60 such that scanning mirror 52 thereof intercepts light patterns from traces 33, 35 and 37 (FIG. 1) of face plate 30 and directs the reflected light patterns forward toward visor 70 of helmet 60 in a substantially horizontal direction when helmet 60 is being worn by an observer. Lenses 40 and 46 are mounted or fixedly attached to helmet 60 and disposed in the optical path between face plate 30 of CRT 20 and mirror 52 of scanning means 50.

CRT 20 may be either the multiple gun type as shown in FIG. 1A or the single gun type illustrated in FIG. 2. As depicted in FIG. 5, CRT 20, lenses 40 and 46 and scanning means 50 may provide a raster scanned image to image plane 44 along optical path 48. Image plane 44 may be considered to be analogous to the rear projection screen of U.S. Pat. Application Ser. No. 264,621 cited above. Image plane 44 may be coupled as shown in U.S. Pat. Application Ser. No. 264,621 for presenting the raster scanned image to both eyes of an observer who is wearing helmet 60, or only to the right eye if a stereoscopic display is desired. A rear projection screen may also be placed at image plane 40 for forming a real image and for increasing the exit pupil of the system.

Analogous apparatus may be mounted or fixedly secured to the other side of helmet 60 for presenting a raster scanned image to the left eye of an observer who is wearing helmet 60 in response to other video information when a stereoscopic display is desired. Additional Optical components such as relay lenses, folding or redirecting mirrors, half-silvered mirrors, prisms rear projection screens and a visor 70 may be provided in the optical path between mirror 52 of scanning means 50 and the eyes of an observer who is wearing helmet 60 for presenting the raster scanned image to the observer as is known in the art.

Referring to FIG. 6, an elevation plan view of another embodiment of the present invention not necessarily to scale is shown. CRT 20, lenses 40 and 46 and scanning means 50 may be mounted or fixedly secured to helmet 60. CRT 20 is disposed such that face plate 30 thereof points substantially forward toward visor 70 of helmet 60 or in a substantially horizontal direction when helmet 60 is being worn by an observer in a typical operating environment. Scanning means 50 is disposed such that mirror 52 thereof intercepts light patterns from traces 33 35 and 37 (FIG. 1) of face plate 30 and directs the reflected light patterns upward or in a substantially vertical direction when helmet 60 is being worn by an observer in a typical operating environment. Lenses 40 and 46 are disposed in the optical path between face plate 30 of CRT 20 and the observer or wearer of helmet 60. CRT 20 may be either the multiple gun type of FIG. 1 or the single gun type of FIG. 2.

Also mounted or fixedly secured to helmet 60 is a redirecting mirror 55. Mirror 55 is disposed in the optical path to intercept light reflected from mirror 52 and redirect or reflect it forward toward visor 70 in a substantially horizontal direction. As illustrated in FIG. 5, CRT 20, lens 40, scanning means 50 and redirecting mirror 55 may provide a raster scanned image to both eyes of an observer who is wearing helmet 60, or only to the right eye if a stereoscopic display is desired. The presentation of the raster scanned image from image plane 44 to the observer may be performed analogously to that described with respect to FIG. 5. Analogous apparatus may be mounted or fixedly secured to the other side of helmet 60 for presenting a raster scanned image to the left eye of an observer who is wearing helmet 60 in response to other video information when a stereoscopic image is desired. Additional optical components such as relay lenses, folding or redirecting mirrors, half-silvered mirrors, prisms rear projection screens, holographic optical elements and a visor 70 may be provided in the optical path between mirror 52 of scanning means 50 and the eyes of an observer who is wearing helmet 60 for presenting the raster scanned image to the observer as is known in the art.

If stereoscopic vision is not desired then the configurations shown in FIGS. 5 and 6 may use a single CRT 20 with appropriate optical components for presenting, as desired, the raster scanned image to one or both eyes of an observer who is wearing helmet 60.

Thus has been illustrated and described a raster graphic helmet mounted display system that uses electronic and electromechanical scanning techniques for generating a raster scanned full color image. Also shown and described is a raster graphic helmet mounted display system for creating a virtual image of a full color raster scanned image that may be typically displayed on the face plate of a standard CRT using only electronic and magnetic deflection, the virtual image for use in a helmet mounted raster scanned full color image display system. A real image is also formed on a screen which may be used to increase the size of the exit pupil.

While only certain preferred features of the invention have been shown by way of illustration, many modifications and changes will occur to those skills in the art. It is to be understood that the appended claims are intended to cover all such modifications and changes as fall within the true spirit and scope of the invention.

What is claimed is:

1. In a helmet mountable display system, a method for forming a first raster scanned full color image for presentation to an observer in response to first video information, comprising:
   generating a respective substantially parallel raster sweep line for each of a first, second and third color component of a corresponding image raster sweep line of the first image in response to a corresponding first, second and third color portion of the first video information;
   reflecting the raster sweep line for each of the first, second and third color component for the first image in a direction transverse the raster sweep line for each of the first, second and third color components for the first image; and
   superimposing the raster sweep line for the first, second and third color component of the image raster sweep line for the first image at a predetermined position along a first optical path between the raster sweep line for each of the first, second and third color component for the first image and the observer, wherein the first raster scanned full color image is available at the predetermined position of the first optical path.

2. The method in claim 1, wherein the step of superimposing includes delaying the first video information for the second color component with respect to the first color component and delaying the first video information for the third color component with respect to the second color component.

3. The method as in claim 1, wherein the step of superimposing includes passing the raster sweep line for the second and third color component through optical means, the optical means for coinciding the raster sweep line for the second and third color component with the raster sweep line for the first color component at the predetermined position.

4. The method as in claim 1, wherein the step of generating includes generating the raster sweep line for each of the first, second and third color component on a cathode ray tube screen and further wherein the first, second and third color components include red, green and blue in a predetermined order.

5. The method as in claim 4, wherein the step of generating includes:
   forming the raster sweep line for each of the first, second and third color components by an electron beam having an image that is elongated transverse the direction of the corresponding raster sweep line for each of the first, second and third color components, and
   compressing the image of the electron beam in a direction transverse the direction of the corresponding raster sweep line for each of the first, second and third color components for forming a substantially circular image of the electron beam at the predetermined position.

6. The method as in claim 5, wherein the step of generating includes sequentially generating the raster sweep line for each of the first, second and third color components by a single electron beam.

7. The method as in claim 5, wherein the step of generating includes generating the raster sweep line for each of the first, second and third color components by a respective electron beam.

8. The method as in claim 1, wherein the first recited steps of generating, reflecting and superimposing are performed for presenting the first image to one eye of the observer, the method further for forming a second raster scanned full color image for presentation to the other eye of the observer in response to second video information, the method further including:

generating a respective substantially parallel raster sweep line for each of a first, second and third color component of a corresponding image raster sweep line of the second image in response to a corresponding first, second and third color portion of the second video information;

reflecting the raster sweep line for each of the first, second and third color component for the second image in a direction transverse the raster sweep line for each of the first, second and third color components for the second image; and superimposing the raster sweep line for the first, second and third color component of the image raster sweep line for the second image at a predetermined position along a second optical path between the raster sweep line for each of the first, second and third color component for the second image and the observer, wherein the second raster scanned full color image is available at the predetermined position of the second optical path for presenting to the other eye of the observer.

9. A helmet mountable display system for supplying a first raster scanned full color image for presentation to a wearer of the helmet in response to first video information, comprising:

first electronic means for generating a first trace for each of a plurality of colors, the intensity of each first trace in response to corresponding color information of the first video information; and first reflecting means having a reflecting surface, the reflecting surface optically coupled to the first electronic means and displaceable about a first axis, the first axis substantially parallel to the first traces, the first reflecting means for scanning the first trace transverse the first trace when the reflecting surface is displaced about the first axis for superimposing the first traces and for providing the first raster scanned full color image at a predetermined position along a first optical path from the first trace to the wearer.

10. The system as in claim 9, further including delay means coupled to the first electronic means, the delay means for delaying the corresponding color information of predetermined ones of the first traces with respect to a predetermined one of the first traces in order to ensure proper color information registration between or among the first traces when the first traces are superimposed.

11. The system as in claim 9, further including optical means disposed between the first traces and the wearer along the first optical path, the optical means for focusing the first traces so that they are superimposed at the predetermined position along the first optical path.

12. The system as in claim 9, further including optical means disposed between the first traces and the wearer, the optical means for compressing the first traces in a direction transverse the sweep direction of the first traces.

13. The system as in claim 9, wherein the first reflecting means further for providing the first image to one eye of the wearer, the system further for supplying a second raster scanned full color image for presentation to a wearer of the helmet in response to second video information, the system further including:

second electronic means for generating a second trace for each of a plurality of colors, the intensity of each second trace in response to corresponding color information of the second video information; and second reflecting means having a reflecting surface, the reflecting surface optically coupled to the second electronic means and displaceable about a second axis, the second axis substantially parallel to the second trace, the second reflecting means for scanning the second trace transverse the second trace when the reflecting surface is displaced about the second axis for superimposing the second traces and for providing the second raster scanned full color image at a predetermined position along a second optical path from the second trace to the wearer for presentation to the other eye of the wearer, wherein the wearer may experience stereoscopic vision when both the first and second raster scanned full color images are presented.

* * * * *